Feb. 24, 1925. 1,527,860
L. GASTL
POTATO DIGGER
Filed Aug. 19, 1922 2 Sheets-Sheet 1
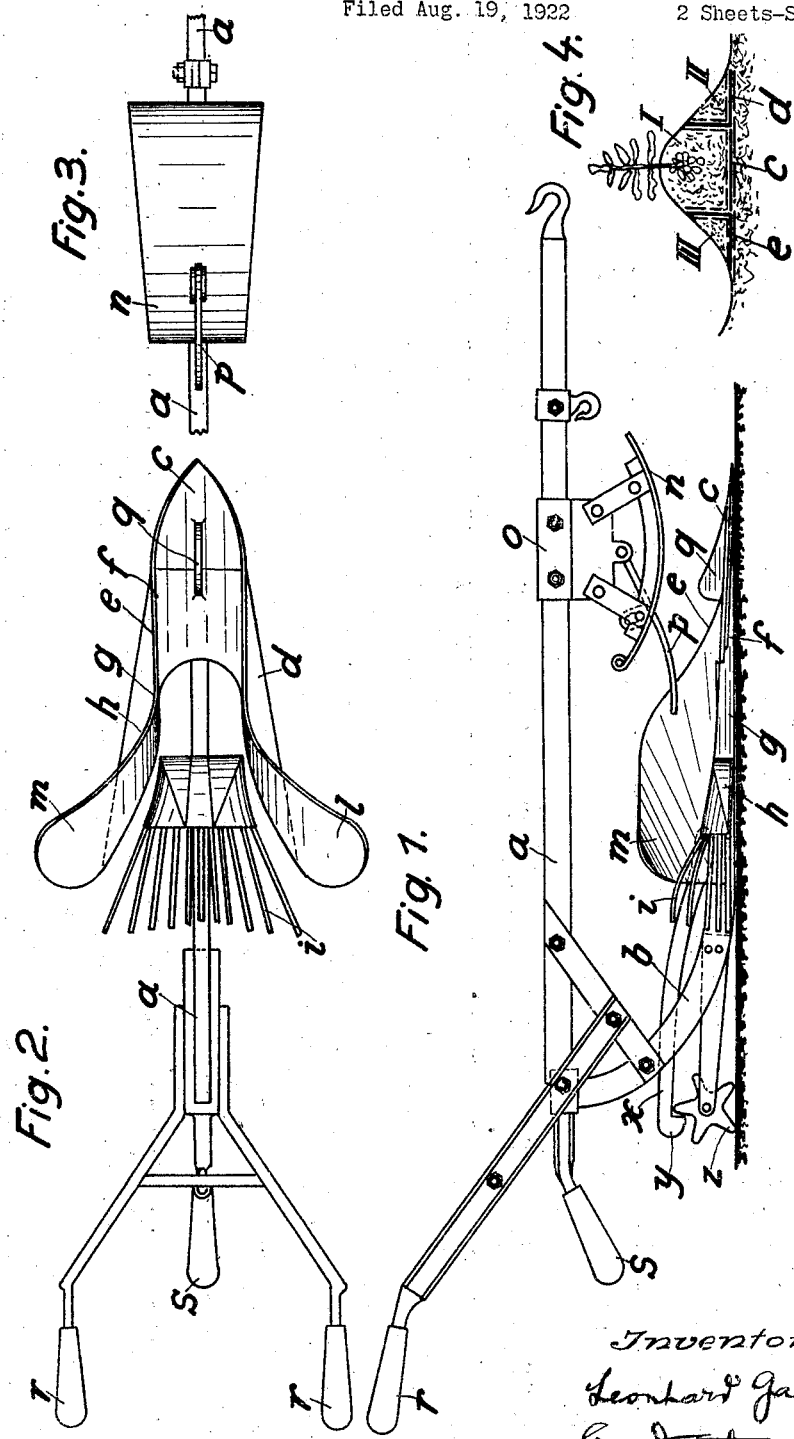

Feb. 24, 1925. 1,527,860

L. GASTL

POTATO DIGGER

Filed Aug. 19, 1922  2 Sheets-Sheet 2

INVENTOR:
Leonhard Gastl

Patented Feb. 24, 1925.

1,527,860

UNITED STATES PATENT OFFICE.

LEONHARD GASTL, OF NEUBURG, GERMANY.

POTATO DIGGER.

Application filed August 19, 1922. Serial No. 583,048.

*To all whom it may concern:*

Be it known that I, LEONHARD GASTL, a citizen of Germany, residing at Neuburg on the Danube, Bavaria, Germany, have invented certain new and useful Improvements in Potato Diggers, of which the following is a specification.

My invention relates to a potato digger which is constructed similarly to a plough, and by means of which the potatoes may be quickly dug without doing any damage to them.

The known plough-like potato-diggers are possessed of the drawbacks that owing to an improper separation of the potato bed the dug potatoes are again covered with earth, and are therefore later on, during the gathering, overlooked so that they get lost. Also the further drawback is experienced that the leaves, or the potato tops respectively, present in front of the shares obstruct the machine because they are not appropriately moved out of the way.

These drawbacks are obviated by the present invention. The improved machine is distinguished by its easy manipulation, as well as by its favorable manner of operation, because owing to an appropriate subdivision of the bed between two furrows, obstructions are obviated and all potatoes are lifted to the surface of the ground.

The invention is characterized by the arrangement of a three-parted share which subdivides the bed into three parallel ridges and the middle part of which is practically flat and has, at its rear, a known rake or grate, whereas the side parts have edges cutting horizontally, as well as vertically into the ground and forming at their ends breast-boards or furrow turner which turn over the severed ridges into the neighbouring furrows.

Figure 5:
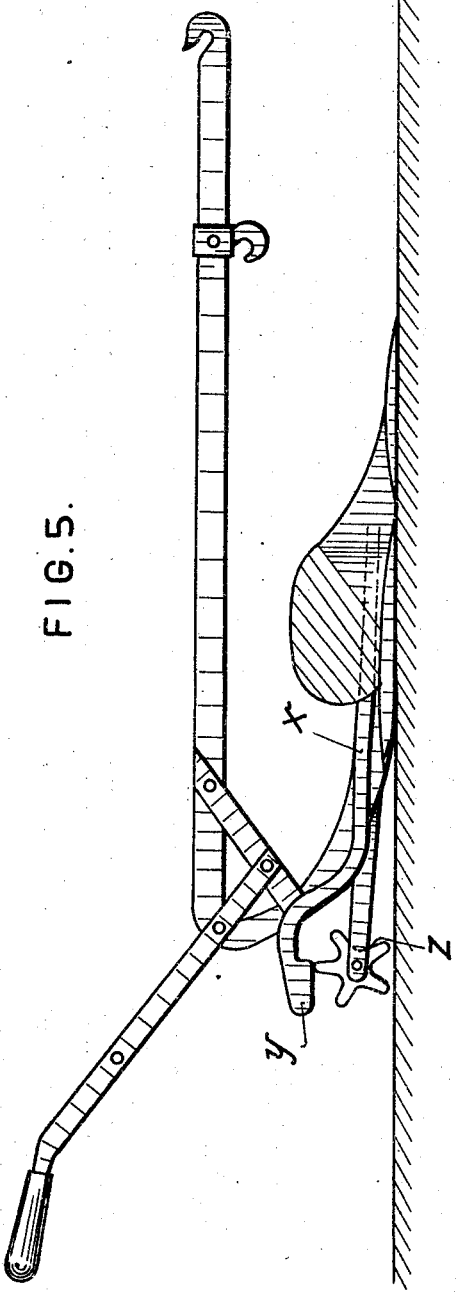
Figure 6:
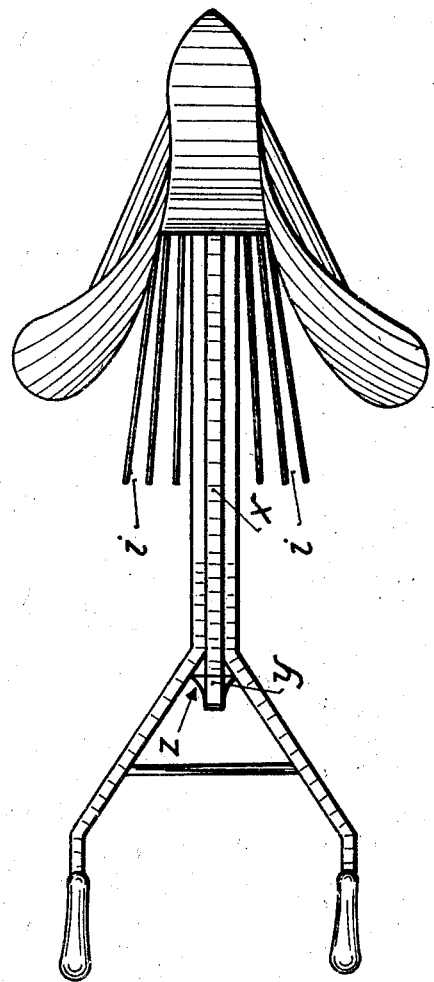

My invention is illustrated, by way of example, in the accompanying drawings in which Fig. 1 is a side view of one form of construction of the improved potato digger, the beam being left away. Fig. 2 is a plan of the same, the plow-beam being partly broken away. Fig. 3 is a bottom view of an attachment to the plough-beam located above the share. Fig. 4 is a transverse section through a potato bed showing a horizontal line and two vertical ones indicating cutting planes. Fig. 5 is an illustration similar to Fig. 1 showing a modified form of construction, and Fig. 6 is a plan of the same.

Referring to Figs. 1-4, the machine consists of a plough-like frame $a$, or plough beam respectively, the rear end $b$ of which is downwardly and forwardly bent and has affixed to it a flat bottom or ground share $c$, from the sides of which extend diverging bent shares $d$ and $e$ in rearward direction. The front portions of these shares form between them a channel $f$ which ascends slightly in rearward direction and serves to receive the potato-containing ground. Behind the front bottom share $c$ is a rear bottom share $h$, and between these two shares is a large aperture $g$. The share $h$ is rearwardly slightly ascending and terminates at its rear in a rake or grate $i$. The object of these parts $h$ and $i$ is to lift the middle portion I of the ground a second time, and to subdivide it. The lateral portions $d$ and $e$ of the main share, or the side shares $d$ and $e$ respectively, are elongated rearwards and form guide-shovels $l$ and $m$, the object of which is to sever off the portions II and III of the bed and to turn them to the sides. Above the share $c$ and the channel $f$ is a curved pressure plate $n$ attached to the beam $a$. This plate is suspended from a slide $o$ which may be displaced along the beam, whereby it may be adjusted with respect to the share portions $c$, $d$, $e$ as well as with respect to the potato-containing ground to be raised.

The slide $o$ serves also as carrier for a rod $p$ which extends rearwards and downwards through the plate $n$. This arm depresses the leaves etc. and cuts into the ground. Below the plate $n$ is a low vertical wall $q$ secured to the front portion $c$ of the share, or main share respectively, which cuts from the rear into the high middle portion of the bed, whereby this wall $q$, co-operating with the bar $p$, so prepares, or preliminarily works respectively the portion I of the bed, that that portion when leaving the channel $f$, is easily and completely shattered or made to fall to pieces respectively. The purpose of the plate $n$, which also cooperates with the parts $p$ and $q$, is to exert a counter-pressure upon the potato-containing ground displaced along in the channel $f$, furthermore, to depress the leaves etc., and consequently to prevent obstructions at all events.

$r$, $r$, $s$ are three handles, of which $r$, $r$ are affixed to two upwardly and rearwardly extending frame members affixed in their turn to the parts $a$ and $b$, whereas $s$ is located between and below the handles $s$, $s$, as shown in Figs. 1 and 2.

The manner of operation of the machine is as follows: The machine is dragged in known manner by horses or other draught-animals or by a motor, and the shares $c$, $d$, $e$ subdivide the bed into the middle ridge I and the two lateral ridges II and III (Fig. 4). The machine is, of course, appropriately adjusted with respect to the bed, viz, in such a manner that the later is subdivided in the just stated manner and the ridge I is a little lifted. Immediately after the share $c$ has made its horizontal cut, the vertical portions of the shares $d$ and $e$ make the vertical cuts, then their lateral horizontal portions cut horizontally at the sides of the cut made by the share $c$, and finally the curved rear portions of the shares $d$, $e$ turn the ridges II, III sideways. The potato-containing ridge I when entering the channel $f$ is subjected from above to the pressure which the plate $n$ exerts upon the leaves etc. whereby these latter parts, including the appertaining portions of the ground, are prevented from rearwardly tilting, and obstructions cannot occur. The plate $n$ depresses the leaves etc. whereby the action of the shares $d$ and $e$ is insured. Owing to the ridges II and III being turned over by the share portions or furrow turner $m$ and $l$, potatoes perhaps present in them get to the upper surface of the ground and the space between these ridges is enlarged or broadened so that the middle ridge I may laterally expand. This is rendered possible by the provision of the aperture $g$ through which the material falls down, after which it is again acted on by the rear share $h$, in that it is raised a second time whereby the material is made to fall to pieces, especially when getting upon the grate or rake $i$ which retains the potatoes, whereas the earth falls through the rod-like spikes of the rake. The potatoes lie, thus, visible upon the rake and may be readily gathered.

The draught-animals need not be put directly to the machine, but an intermediate cart may be inserted between them and the machine; or, if preferred, a suitable motor may be employed. As the arrangement of the shares is particularly suited to the purpose, the power required to drag the machine is but small, and the manipulation and guidance during work is simple and easy.

Referring now to Figs. 5 and 6, the rake or grate $i$ is so arranged, as to permit of slewing in vertical direction; and means are provided for shaking it during work, so that the earth and the potatoes are thoroughly separated from each other. The rod-like spikes of the rake $i$ are affixed to a transverse bar or axle which is rocked by a lever $x$, the free end $y$ of which is acted on by a star-wheel $z$, as shown, whereby the rake is shaken as required. It is obvious that any other suitable mechanical means may be employed for the purpose in question. In the case of a star-wheel, for instance like $z$, the arrangement is preferably such that this wheel contacts with the ground so that it is rotated by it, the motion being then transmitted to the rake by the lever $x$ which at the same time converts the rotary motion into a rocking one.

I wish it to be understood that I do not desire to be limited to the exact details of construction and configuration shown and described herein, for obvious modifications will occur to a person skilled in the art.

I claim:

1. A potato-digger, comprising in combination, a frame, and a three-parted share, comprising in its turn, a practically flat middle member adapted to cut in a practically horizontal plane into the potato bed; and two lateral members consisting each of a horizontal portion adapted to enlarge laterally the cut made by said middle member, a vertical portion adapted to make a vertical cut down to said horizontal one, and an outwardly curved furrow turner adapted to turn over the lateral ridges formed by said lateral members; and a rake at the rear end of said middle member.

2. A potato-digger, comprising in combination, a frame and a three-parted share, comprising in its turn, a practically flat middle member adapted to cut in a practically horizontal plane into the potato-bed; and two lateral members consisting each of a horizontal portion adapted to enlarge laterally the cut made by said middle member, a vertical portion adapted to make a vertical cut down to said horizontal one, and of an outwardly and upwardly curved furrow turner adapted to turn over the lateral ridges formed by said lateral members; and a rake at the rear end of said middle member, said rake being rearwardly ascending, and its spikes being diverging practically corresponding to the rearwardly and upwardly widening space between the last-mentioned portions of the lateral share members.

3. A potato-digger, comprising in combination, a frame, and a three-parted share, comprising in its turn a practically flat middle member consisting of two consecutive portions having each a cutting edge at its front and an aperture between them and being adapted to cut in a practically horizontal plane into the potato-bed; and two lateral members consisting each of a horizontal portion adapted to enlarge laterally the cut made by said middle member, a vertical portion adapted to make a vertical cut down to said horizontal one, and an outwardly curved furrow turner adapted to turn over the lateral ridges formed by said lateral members; and a rake at the rear end of said middle member.

4. A potato-digger, comprising in combination, a frame, and a three-parted share, comprising in its turn, a practically flat middle member adapted to cut in a practically horizontal plane into the potato-bed; and two lateral members consisting each of a horizontal portion adapted to enlarge laterally the cut made by said middle member and forming a channel between them, a vertical portion adapted to make a vertical cut down to said horizontal one, and an outwardly curved furrow turner adapted to turn over the lateral ridges formed by said lateral members; a rake at the rear end of said middle member; and means provided in said channel and being adapted to break up the middle ridge formed by said share parts.

5. A potato-digger, comprising in combination, a frame, and a three-parted share, comprising in its turn a practically flat middle member adapted to cut in a practically horizontal plane into the potato-bed; and two lateral members consisting each of a horizontal portion adapted to enlarge laterally the cut made by said middle member and forming a channel together with them, a vertical portion adapted to make a vertical cut down to said horizontal one, and an outwardly curved furrow turner adapted to turn over the lateral ridges formed by said lateral members; a rake at the rear end of said middle member; and a longitudinal vertical rib provided in said channel and being adapted to break up the middle ridge formed by said share parts.

6. A potato-digger, comprising in combination, a frame, and a three-parted share, comprising in its turn a practically flat middle member adapted to cut in a practically horizontal plane into the potato-bed; and two lateral members consisting each of a horizontal portion adapted to enlarge laterally the cut made by said middle member, a vertical portion adapted to make a vertical cut down to said horizontal one, and an outwardly curved furrow turner adapted to turn over the lateral ridges formed by said lateral members; a rake at the rear end of said middle member; and means for shaking said rake.

7. A potato-digger, comprising in combination, a frame, and a three-parted share, comprising in its turn, a practically flat middle member adapted to cut in a practically horizontal plane into the potato-bed; and two lateral members consisting each of a horizontal portion adapted to enlarge laterally the cut made by said middle member, a vertical portion adapted to make a vertical cut down to said horizontal one, and an outwardly curved furrow turner adapted to turn over the lateral ridges formed by said lateral members; a rake at the rear end of said middle member and being adapted to be vertically rocked; a star-wheel located at the end of the machine just over the ground and being adapted to be rotated by it; and means for transmitting the motion of said wheel to said rake and converting the rotary motion into rocking one.

8. A potato-digger, comprising in combination, a frame and a three-parted share, comprising in its turn, a practically flat middle member adapted to cut in a practically horizontal plane into the potato-bed; and two lateral members consisting each of a horizontal portion adapted to enlarge laterally the cut made by said middle member, a vertical portion adapted to make a vertical cut down to said horizontal one, and an outwardly curved furrow turner adapted to turn over the lateral ridges formed by said lateral members; a rake at the rear end of said middle member and being adapted to be vertically rocked; a star-wheel located at the end of the machine just over the ground and being adapted to be rotated by it; and a lever connected with said rake and extending rearwards to just over said star-wheel and being adapted to be rocked by it.

In testimony whereof I affix my signature.

LEONHARD GASTL.

Witnesses:
ALEXANDER DE SOTO,
ALEXEI PHILIPPOFF.